(12) United States Patent
Hamady

(10) Patent No.: US 7,451,667 B2
(45) Date of Patent: *Nov. 18, 2008

(54) PRECESSIONAL DEVICE AND METHOD

(76) Inventor: Peter Winston Hamady, 935 Waverly, Palo Alto, CA (US) 94301

( * ) Notice: Subject to any disclaimer, the term of this patent is extended or adjusted under 35 U.S.C. 154(b) by 0 days.

This patent is subject to a terminal disclaimer.

(21) Appl. No.: 11/549,642

(22) Filed: Oct. 14, 2006

(65) Prior Publication Data

US 2007/0169575 A1    Jul. 26, 2007

Related U.S. Application Data

(63) Continuation of application No. 10/428,761, filed on May 2, 2003, now Pat. No. 7,181,987.

(51) Int. Cl.
| | |
|---|---|
| G01C 19/24 | (2006.01) |
| G01C 19/02 | (2006.01) |
| G01C 19/30 | (2006.01) |
| A63B 23/14 | (2006.01) |
| A63B 21/22 | (2006.01) |

(52) U.S. Cl. .................... 74/5.12; 74/5.34; 74/5.47; 482/44; 482/110

(58) Field of Classification Search ............ 74/5 R–5 F, 74/5.1, 5.12, 5.22, 5.34, 5.37, 5.4, 5.47, 5.41, 74/5.7, 5.8, 5.9; 482/44–50, 110
See application file for complete search history.

(56) References Cited

U.S. PATENT DOCUMENTS

| | | | |
|---|---|---|---|
| 850,938 | A | 4/1907 | Kellogg et al. |
| 942,952 | A | 12/1909 | Wrather |
| 1,058,786 | A | 4/1913 | Newkirk et al. |
| 1,175,372 | A | 3/1916 | Newcomb |
| 1,250,266 | A | 12/1917 | Banks |
| 1,692,412 | A | 11/1928 | Koenig |
| 1,735,058 | A | 11/1929 | Schuler |
| 2,747,326 | A | 5/1956 | Doyle |
| 2,762,123 | A | 9/1956 | Schultz et al. |
| 2,845,800 | A | 8/1958 | Holmes, Jr. |
| 2,912,865 | A | 11/1959 | Cremiers |
| 2,999,390 | A | 9/1961 | Bosch et al. |
| 3,071,977 | A | 1/1963 | Bosch et al. |

(Continued)

FOREIGN PATENT DOCUMENTS

DE            374175            4/1923

(Continued)

OTHER PUBLICATIONS

English Translation of French Patent 2,293,608 Dated Dec. 3, 1974.

*Primary Examiner*—Roger Pang
(74) *Attorney, Agent, or Firm*—Jeffrey Schox

(57) ABSTRACT

A precessional device having independent control of the output torque generated by the device and the oscillation rate of the device is disclosed. The device comprises a rotor supported by an axle wherein the ends of the axle are supported by a circular race. The circular race is rotatable, and may be driven by a motor or other means, thereby controlling the oscillation rate of the device independently of the output torque arising from the rotation rate of the rotor. The motor may be controlled by a control program that adjusts the rotation rate of the circular race to modify the shape of the resistance curve.

21 Claims, 9 Drawing Sheets

U.S. PATENT DOCUMENTS

| | | |
|---|---|---|
| 3,141,669 A | 7/1964 | Chul |
| 3,164,382 A | 1/1965 | Johnson |
| 3,276,777 A | 10/1966 | Pruitt |
| 3,320,819 A | 5/1967 | Riordan |
| 3,439,548 A | 4/1969 | Horvath |
| 3,451,275 A | 6/1969 | Atkin |
| 3,482,835 A | 12/1969 | Dean |
| 3,617,056 A | 11/1971 | Herbold |
| 3,648,525 A | 3/1972 | Reed |
| 3,665,283 A | 5/1972 | Le Gall |
| 3,691,853 A | 9/1972 | Curriston et al. |
| 3,719,074 A | 3/1973 | Lynch |
| 3,726,146 A * | 4/1973 | Mishler ................. 74/5 R |
| 3,737,162 A | 6/1973 | Wood |
| 3,742,770 A | 7/1973 | Fannelly |
| 3,756,592 A | 9/1973 | Johnson |
| 3,784,363 A | 1/1974 | Flannelly |
| 3,805,625 A | 4/1974 | Schlitt |
| 3,841,627 A | 10/1974 | Vetter |
| 3,843,117 A | 10/1974 | Johnson |
| 3,858,328 A | 1/1975 | La Rose |
| 3,901,503 A | 8/1975 | Klose |
| 4,077,626 A | 3/1978 | Newman |
| 4,110,631 A | 8/1978 | Salter |
| 4,150,580 A | 4/1979 | Silkebakken et al. |
| 4,169,391 A | 10/1979 | Schonberger |
| 4,302,006 A | 11/1981 | Johnson |
| 4,343,203 A | 8/1982 | Jacobson et al. |
| 4,361,055 A | 11/1982 | Kinson |
| 4,387,513 A | 6/1983 | Cowdin |
| 4,448,086 A | 5/1984 | Kennel |
| 4,461,176 A | 7/1984 | Nearman et al. |
| 4,472,978 A | 9/1984 | Levine et al. |
| 4,528,864 A | 7/1985 | Craig |
| 4,640,508 A | 2/1987 | Escher |
| 4,655,096 A | 4/1987 | Westhaver et al. |
| 4,658,659 A | 4/1987 | Gruber |
| 4,684,124 A | 8/1987 | Escher |
| 4,703,928 A | 11/1987 | Escher |
| 4,706,389 A | 11/1987 | Eisenhammer |
| 4,712,439 A | 12/1987 | North |
| 4,799,667 A | 1/1989 | Suchy |
| 4,824,099 A | 4/1989 | Rusu et al. |
| 4,825,716 A | 5/1989 | Roberts et al. |
| 4,951,514 A | 8/1990 | Gubin |
| 5,024,112 A | 6/1991 | Kidd |
| 5,046,721 A | 9/1991 | Altare |
| 5,058,571 A | 10/1991 | Hall |
| 5,090,260 A | 2/1992 | Delroy |
| 5,092,581 A | 3/1992 | Koz |
| 5,150,625 A | 9/1992 | Mishler |
| 5,184,521 A | 2/1993 | Tyler |
| 5,243,868 A | 9/1993 | Schonberger |
| 5,256,942 A | 10/1993 | Wood |
| 5,259,571 A | 11/1993 | Blazquez |
| 5,297,052 A | 3/1994 | McIntyre et al. |
| 5,335,561 A | 8/1994 | Harvey |
| 5,342,244 A | 8/1994 | Nelson |
| D350,796 S | 9/1994 | Pravitz |
| D315,437 S | 10/1994 | Pravitz |
| D351,436 S | 10/1994 | Pravitz |
| D351,437 S | 10/1994 | Pravitz |
| 5,353,655 A | 10/1994 | Mishler |
| 5,360,363 A | 11/1994 | Levin |
| D365,612 S | 12/1995 | Pravitz |
| 5,517,205 A | 5/1996 | Van Heyningen et al. |
| 5,594,169 A | 1/1997 | Field et al. |
| D381,719 S | 7/1997 | Pravitz |
| 5,766,112 A | 6/1998 | Chuan |
| 5,800,311 A | 9/1998 | Chuang |
| 5,809,938 A * | 9/1998 | Baiera et al. ................. 119/707 |
| 5,871,249 A | 2/1999 | Williams |
| 6,053,846 A | 4/2000 | Lin |
| 6,401,556 B1 * | 6/2002 | Hamady .................... 74/5.34 |
| 6,612,895 B2 * | 9/2003 | Sze ........................... 446/233 |
| 6,860,166 B2 * | 3/2005 | Hintz ........................ 74/5.47 |
| 7,225,674 B2 * | 6/2007 | Clark ..................... 73/514.32 |

FOREIGN PATENT DOCUMENTS

| | | |
|---|---|---|
| DE | 1548544 | 10/1966 |
| DE | 2825490 A1 | 12/1979 |
| DE | 3523160 A1 | 1/1987 |
| FR | 2293608 | 12/1974 |
| JP | 60-561182 | 1/1985 |
| RU | 2000829 C1 | 10/1993 |
| SU | 1769901 A1 | 8/1990 |
| SU | 2004275 C1 | 12/1991 |

* cited by examiner

PRECESSIONAL DEVICE AND METHOD

CROSS-REFERENCE TO RELATED APPLICATIONS

This application is a continuation of prior application Ser. No. 10/428,761 entitled "Precessional Device and Method" and filed 2 May 2003, which is incorporated in its entirety by this reference.

FIELD OF THE INVENTION

The present invention relates to precessional devices. More specifically, the invention relates to a device and method which utilize precessional forces in a controlled manner.

BACKGROUND

Most existing precessional devices are passive devices that require a deflecting torque from an external source to generate a precessional torque. A common example of this type of precessional device is the gyroscopic heading indicator used for aviation navigation. The spinning rotor inside such a device does not generate precessional torque on its own, rather, it simply responds to the torque exerted on it (by the directional changes of the aircraft) by maintaining its original heading relative to the magnetic compass.

In contrast to this passive type of precessional device, U.S. Pat. No. 6,401,556 issued to Hamady on Jun. 11, 2002, herein incorporated by reference in its entirety, discloses a precessional device which generates a precessional torque without requiring an externally inputted deflecting torque. The disclosed device employs rotors which precess along a circular race or track. Axles run through each rotor making contact at either end with the surface of the tracks. The rotors' spin rate, $\omega_s$, is directly proportional to the rotational velocity, $\omega_r$, which is defined as the frequency of the rotors' precession around the track. The relationship between $\omega_r$ and $\omega_s$ is determined by the ratio of the diameter of the axle tips such that $\omega_s = \omega_r d_{track}/d_{axle}$. The practical implication of this direct relationship is that the rotor speed (and resulting net precessional output torque) can not be increased without a corresponding increase in the oscillation frequency (Hz) of the net output torque. This limits the devices usefulness in applications such as resistive exercise where high resistance is often associated with slower movements and low resistance exercise is often associated with faster movements. Therefore, there remains a need for a device where $\omega_s$ may be increased beyond the constraints defined by $\omega_s = \omega_r d_{track}/d_{axle}$, including but not limited to, a device where $\omega_s$ and $\omega_r$ may be controlled independently of each other.

SUMMARY OF THE INVENTION

One embodiment of the present invention is directed to an apparatus comprising: a rotor spinning at a rotor spin rate about a spin axis; an axle supporting the rotor, the axle having a first axle tip, a second axle tip, and a longitudinal axis aligned with the spin axis of the rotor; a rotatable circular race in rolling contact with the first axle tip and in rolling contact with the second axle tip at a point on the circular race diametrically opposite the first axle tip; a motor for rotating the circular race; and a controller for controlling the rotation of the circular race independently of the rotor spin rate.

Another embodiment of the present invention is directed to an apparatus comprising: a rotor spinning about a rotor axle at a rotor spin rate; a track assembly in rolling contact with the rotor axle during precessional movement of the rotor; and means for rotating the track assembly independently of the rotor spin rate.

Another embodiment of the present invention is directed to an apparatus comprising: a first rotor spinning about a first spin axis and rotating about a first rotational axis inside a first rotatable track assembly, the first track assembly having a first tract rotation axis coincident with the first rotational axis; a second rotor spinning about a second spin axis and rotating about a second rotational axis inside a second rotatable track assembly the second track assembly having a second tract rotation axis coincident with the second rotational axis; and a housing supporting the first rotatable track assembly and the second track assembly, wherein neither spin axes are parallel to the rotational axes.

Another embodiment of the present invention is directed to a method for modifying a resistance curve characterized by a periodicity, the resistance curve generated by a precessional device, the method comprising: providing a precessional device comprising a rotor spinning at a spin frequency capable of precessional rotation at a precessional frequency in a track assembly; and rotating the track assembly to modify the periodicity of the resistance curve.

BRIEF DESCRIPTION OF THE FIGURES

The invention will be described by reference to the preferred and alternative embodiments thereof in conjunction with the drawings in which:

FIG. 6b is a side view rendering illustrating the embodiment shown in FIG. 6a;

DESCRIPTION OF THE PREFERRED EMBODIMENTS

Figure 1:
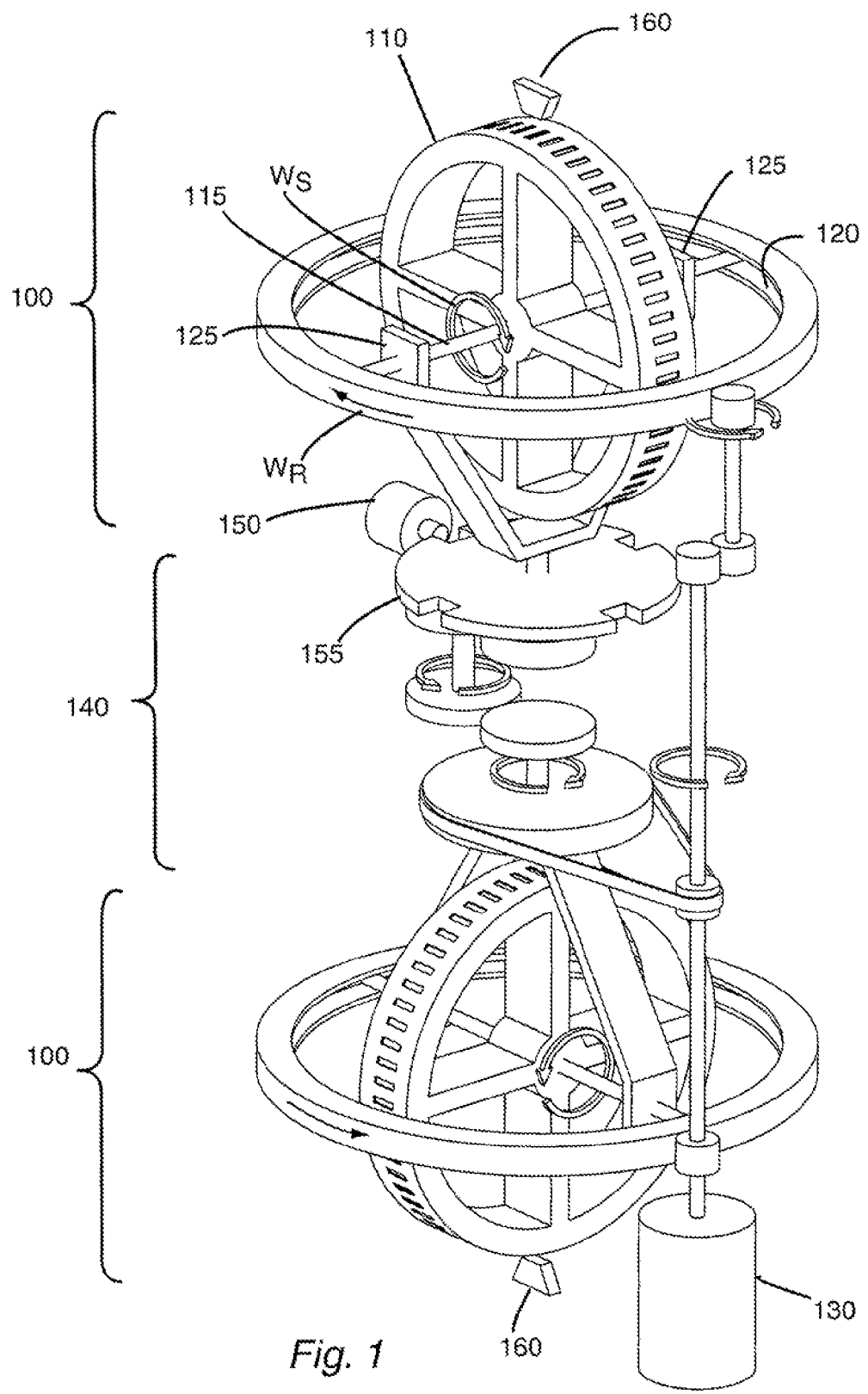
FIG. 1 is a perspective view of one embodiment of the present invention.

FIG. 1 is an illustration of one embodiment of the present invention. The device illustrated in FIG. 1 includes two flywheel assemblies. Each assembly 100 consists of a flywheel, or rotor 110, supported by an axle 115 that extends at either end into a circular race or "track" 120. Bearing mounts 125 disposed toward each end of the axle 115 generate a preload that causes the flywheel/rotor assembly to cant at an angle, $\theta$. In some embodiments, a motor 130 drives each track 120 through a transmission 140 that causes the tracks 120 to counter-rotate. The motor 130 may be permanently attached to the device or may be external to the device and applied to rotate the tracks during the start-up of the device. Other means for driving the rotation of the tracks 120 such as, for example, manually rotating the tracks should be apparent to one of skill in the art and are intended to be encompassed within the scope of the present invention. The motor 130 may be engaged to initially bring the track rotation and rotor spin rate to an operational range and disengaged once the track rotation and rotor spin rate are within their respective operational range. In the embodiment shown in FIG. 1, the tracks are vertically aligned or "stacked."

A locking solenoid 150, when engaged to a lock plate 155, keeps the position of the axle 115 fixed. The locking solenoid 150 and lock plate 155 act as a clutch such that when the locking solenoid 150 is engaged with the lock plate 155, the rotation of the motor driven track 120 provides a driving force to increase or decrease the spin rate of the rotor 110 about the rotor axis. Disengaging the locking solenoid 150 from the lock plate 155, allows the spinning rotor 110 to rotate, or precess, about the rotation axis of the rotatable track 120.

Figure 2:
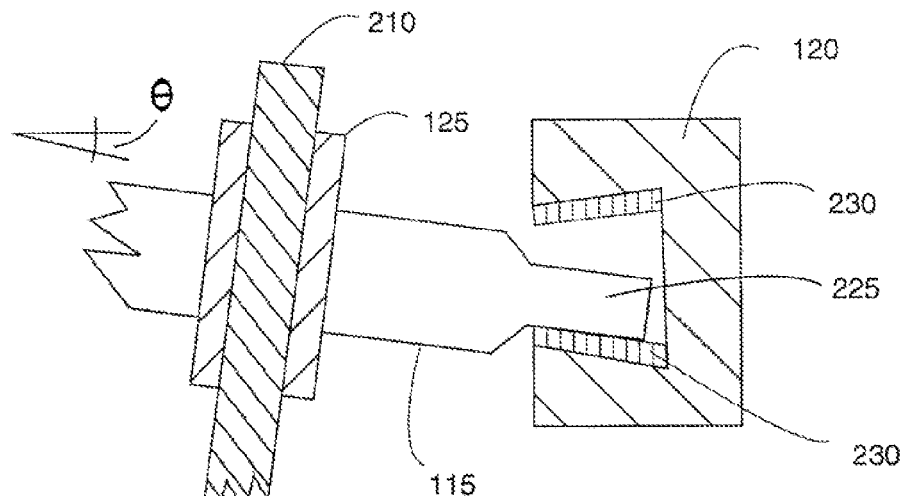
FIG. 2 is a section view of the axle and track assembly in another embodiment of the present invention.

FIG. 2 is a section view of a detail of FIG. 1 showing the axle tip configuration in the circular race. Referring to FIG. 2, axle 115 is supported by bearing mount 125, which is supported by the axle tip support 210. The axle 115 is canted at an angle, θ, from horizontal such that the axle tip 225 is in rolling contact with the lower surface 230 of the track 120. Although not shown in FIG. 2, the opposite end of the axle 115 contacts the upper surface of the track 120. The profile of the axle tip 225 is configured to allow rolling contact with the track surfaces 230 and is not limited by the exemplar profile shown in FIG. 2. In FIG. 2, the profile of the axle tip is cylindrical and is matched to an angled track surface that corresponds to the cant angle of the axle. Other profiles such as, for example, a tapered axle tip having a taper angle approximately the same as the cant angle of the axle may be matched to a horizontal, with respect to the orientation shown in FIG. 2, track surface and should be understood to be encompassed within the scope of the present invention.

Figure 3:
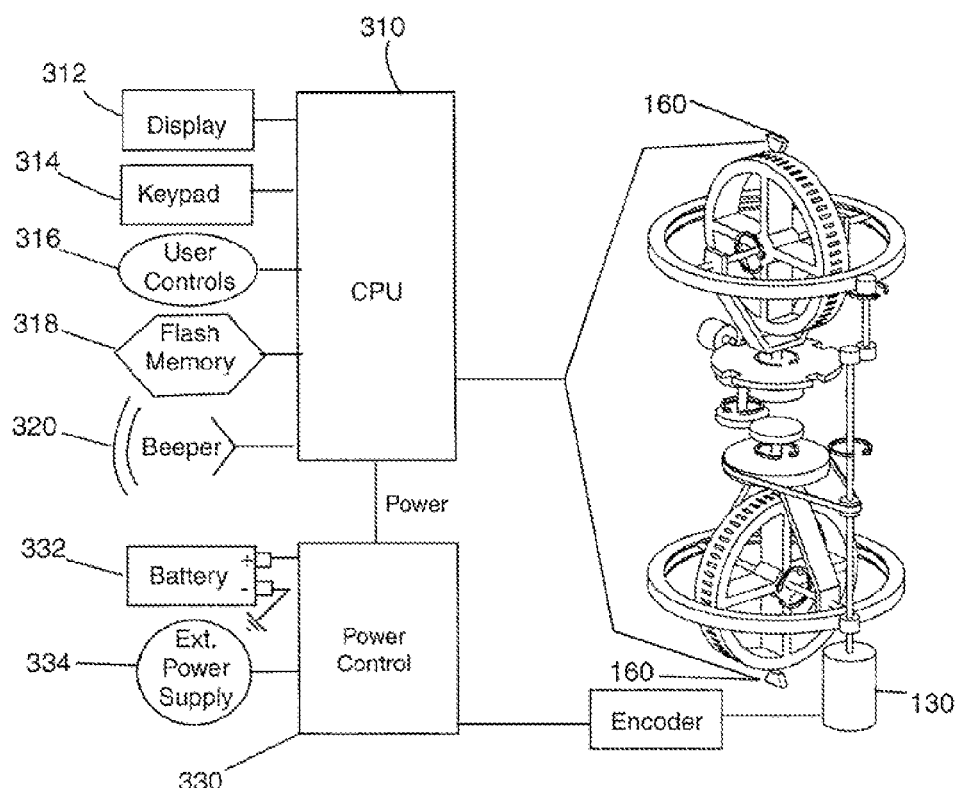
FIG. 3 is a schematic diagram of the controller for the embodiment shown in FIG. 1.

FIG. 3 is a schematic block diagram illustrating one embodiment of the controller for the precessional device. CPU 310 controls a user display 312, user input devices such as, for example, a keypad 314 or user controls 316. Memory 318, such as for example, flash memory provides storage for the control program and data structures executed by the CPU 310. Audio or visual alarms, such as for example, a beeper 320 are also controlled by the CPU 310 and provide feedback to the user. CPU 310 provides power control 330 for the regenerative motor 130. The power source for the motor may be supplied by batteries 332 in the device or by an external power supply 334. Retro-reflective opto-electronic sensor 160, positioned on the axis of precession, provides the speed of each rotor 110 to the CPU 310. An encoder within the track drive motor 130 provides track speed data to the CPU 310. The current in the motor coil may be measured via a current sensor such as, for example, a sense resistor and provided to the CPU 310. The current sensor may be calibrated by the control program executing on the CPU 310. The deflection angle indicating the angular position of the axle tip 225 along the circumference of the track 120 is provided to the CPU 310 by a sensor such as, for example, a piezoelectric gyro or goniometer.

The frictional contact between the moving track 120 and the axle tips causes the flywheel 110 to rotate about the axle 115. In one embodiment, the rotor may accelerate to thousands of RPM as they are driven by the frictional contact between the flywheel axle tips and the moving track driven by the motor 130. No precessional torque is generated during the spin-up of the flywheel, however, because travel of the tips within the track 120 is prevented by the engaged locking solenoid 150.

At a preset rotor speed sufficient to generate a noticeable output torque, the locking solenoid 150 disengages and current to the motor 130 driving the tracks 120 is cut. When current is cut to the motor 130, the motor 130 acts as an electronic brake, braking the rotation of the tracks. In a preferred embodiment, the low transmission ratio from the tracks to the motor multiplies the braking effect of the motor thereby quickly stopping the rotating tracks. The rotational inertia of the spinning flywheel coupled by the frictional contact between axle tips and track causes the rotor assembly to precess around the track.

The precession of the rotor assembly 100 around the track 120 acts as a deflecting torque on the spinning flywheel thereby generating a precessional torque that is perpendicular to both the deflecting torque and the axis of rotation. In the embodiment shown in FIG. 1, the precessional torque generates a force that is normal to the surface of the track such that the axle tip is pressed into the surface of the track, as shown in FIG. 2. The combined, net torque generated by the rotor assemblies, provides the resistive force that the user must overcome. In other words, the operator exercises against this resistive force.

When the user inputs a deflecting torque against the rotor-generated precessional torque, causing the track surfaces to push back on the axle tips, a second precessional torque is generated in the direction of the rotation of the rotor assemblies. The second precessional torque causes an acceleration of the rotor assemblies around their respective tracks. The increased rotational velocity around the track, and the corresponding increase in spin velocity, increases the rotor-generated precessional torque according to the formula $\tau = I\omega_s\omega_r$, where I is the rotational inertia of the rotors, $\omega_s$ is the spin velocity of the rotors, and $\omega_r$ is the rotational velocity of the rotor around the track.

The preferred range for spin velocity of the rotor depends on the size and mass of the rotor and on the desired torque output from the device. In some embodiments, the rotor spins at an operational angular speed of between approximately 2,000-15,000 RPM, preferably between 4,000-12,000 RPM, and most preferably between 8,000-10,000 RPM. In some embodiments, the precession of the axle tip in the circular race 120 is between about 0.25-2.0 Hz. Once operational speed has been reached, the rotational energy of the rotor assemblies drives the tracks' counter-rotation. The track motor continues to act as an electronic brake, siphoning energy out of the system to recharge the batteries.

Figure 4A:
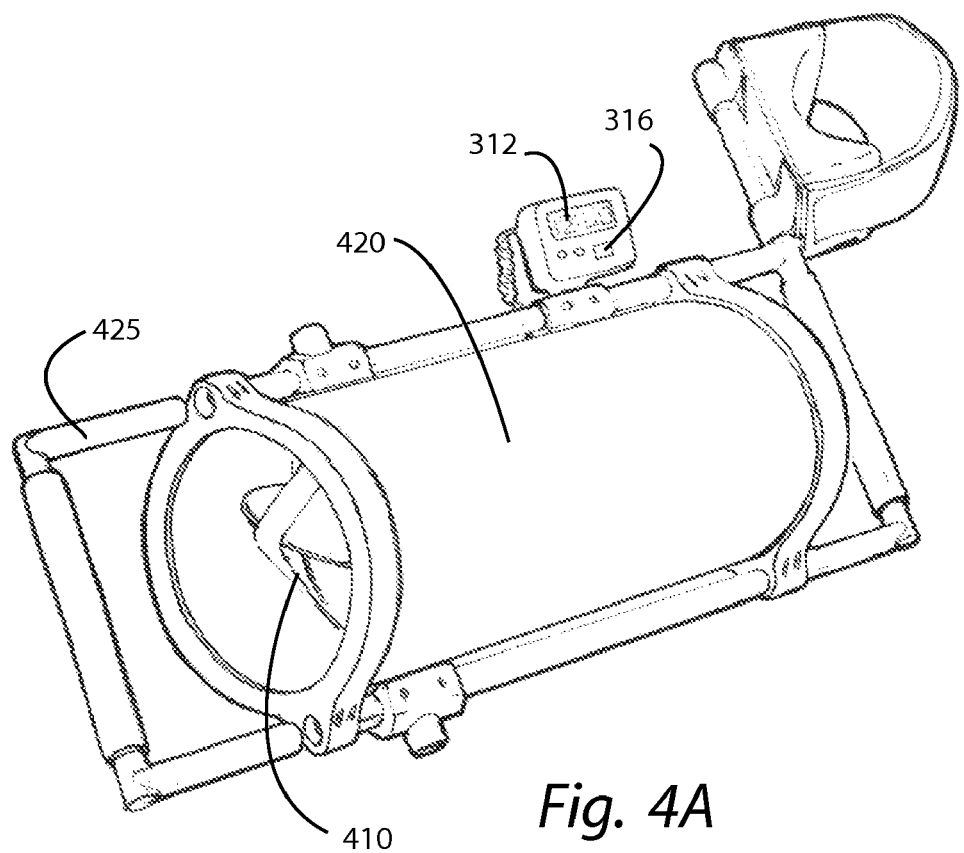
FIG. 4a is a perspective view of the embodiment shown in FIG. 1 housed in a hand-held exercise device.

FIG. 4a is an illustration of one embodiment of the present invention. The precessional engine 410 may be packaged in a housing 420 that allows for safe and comfortable manipulation by a user. The housing 420 provides secure support for the precessional engine 410 and transmits the internal forces generated by the precessional engine 410 through the detachable outer handle 425 or other outer attachment accessories. The device produces a smooth, harmonic oscillating net torque that can be used as the basis for resistive exercise including concentric and eccentric muscle exertions and aerobic and anaerobic exercises.

Figure 4B:
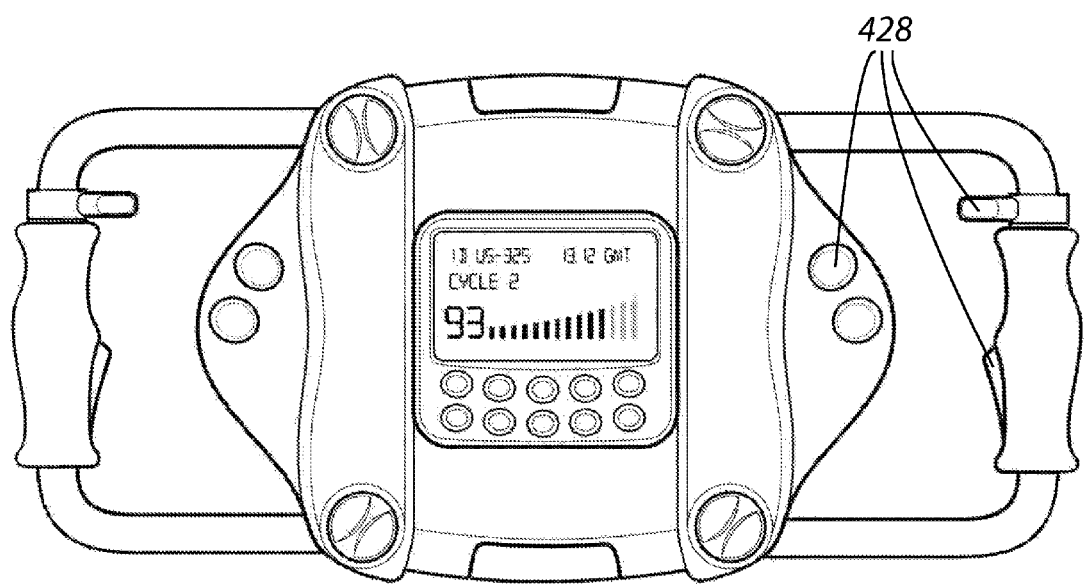
FIG. 4b is a perspective view of another embodiment of the present invention.

FIG. 4b is an illustration of another embodiment of the present invention. The housing provides for ergonomically designed inputs 428 for the user to control operations.

As previously described, the torque sensed by a user interacting with the device is defined by: $\tau = I\omega_s\omega_r$, where I is the inertia of the rotors (a function of their shape and mass), $\omega_s$ is the rotor spin velocity (about the axis of the rotor axle) and $\omega_r$ is the rotational velocity of the rotor assemblies around the track. The rotational velocity, $\omega_r$, also referred to herein as the precessional velocity, determines the oscillation rate (Hz) of the net torque generated by the device.

In known precession devices, there is a fixed relationship, or ratio, between the rotor spin velocity, $\omega_s$, and the rotational velocity, $\omega_r$. The ratio, $\omega_s/\omega_r$, may be determined by assuming pure rolling of the axle tip on a fixed track surface, resulting in the relation, $\omega_s/\omega_r = D_t/D_a$, where $D_t$ is the diameter of the track and $D_a$ is the diameter of the axle tip. Both $D_t$ and $D_a$ are fixed and therefore $\omega_s/\omega_r$ is also fixed once $D_t$ and $D_a$ are specified. Thus, in known precession devices, a given $\omega_s$ corresponds to a given $\omega_r$. An increase $\omega_s$ results in a proportional increase $\omega_r$. The user may increase $\omega_r$ by manipulating the device at a higher tempo, which increases the deflecting torque on the rotors, causes an angular acceleration of the rotor assemblies around the track, and produces a higher torque output, τ. The fixed ratio of $\omega_s/\omega_r$, however, requires an increase in $\omega_r$. Therefore, as the output torque is increased, the oscillation rate of the output torque must also increase. For the expected range of output torques useful in exercise devices, the oscillation rate is usually higher than the 0.5-1.5 Hz oscillation rate preferred for resistive exercise.

In contrast to the fixed relation between the output torque and oscillation rate of the output torque of prior art devices, the present invention allows independent control of the output torque and oscillation rate regardless of the ratio of the track diameter to the axle diameter. The decoupling of the output torque from the oscillation rate of the present invention allows for a more compact precessional engine that provides sufficient resistive exercise over a wider range of resistive forces and oscillation rates.

In a preferred embodiment, the track 120 is rotatable and may be counter-rotated relative to the precession of the rotor. Counter-rotation of the track relative to the precession of the rotor allows for a greater effective rotor spin velocity with a smaller track diameter, allowing for more compact device designs than previously achievable. The relative precession rate, $\omega_{rp}$, is the rate of rotation of the rotor assembly relative to the track surface and is given by $\omega_{rp}=\omega_r+\omega_t$, where $\omega_t$ is the rotation rate of the track. In the rotating track system, a relative precession rate of 4 Hz, for example, may be achieved as a combination of actual rotor assembly rotation relative to the device as a whole $\omega_r$, and the rate of track counter-rotation $\omega_t$. For example, $\omega_r$ is 1 Hz and $\omega_t$ is 3 Hz, the relative precession rate, $\omega_{rp}$, is 4 Hz. The resulting output torque, τ, is 4 times greater than it would be if the track were stationary, since $\omega_{rp}$ is 4 times greater than $\omega_r$. The user may therefore control torque output during operation by increasing or decreasing the track counter-rotation rate, $\omega_t$.

Figure 5:
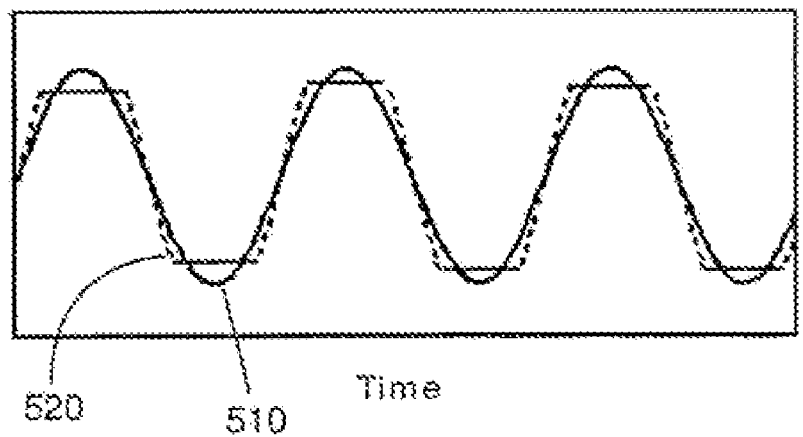
FIG. 5 is a graph illustrating a sinusoidal and modified resistance curve generated by one embodiment of the present invention.

FIG. 5 is a graph illustrating a resistance curve of one embodiment of the present invention. A typical resistance curve 510 is shown as a solid line in FIG. 5 and exhibits sinusoidal variation in the torque as a function of time. The sinusoidal variation arises from the precession of the rotor assembly along the circumference of the track. In many instances, however, it is desirable to modify the shape of the resistance curve to other than a perfect sinusoid.

In some embodiments, the present invention allows for modification of the sinusoidal resistance curve 520 by computer control of the motorized rotor, precession, and track speed. The sinusoidal resistance curve may be modified by, for example, reducing the precession rate near the peak output, which flattens the force output and generates a more constant resistance force across each oscillation.

As an illustrative example, the track speed may be controlled on a real-time basis to accelerate track counter-rotation when the net torque curve nears its peak. If the rotor spin rate, $\omega_s$, is constant, the relative precession rate, $\omega_{rp}$, will also remain constant. As the track rotation rate, $\omega_t$, is increased, $\omega_r$ must decrease in order to maintain constant $\omega_{rp}$. As $\omega_r$ decreases, however, the output torque is also reduced thereby flattening the resistance curve.

Independent control of the track rotation may be used to quickly stop the precession of the rotor assembly if the user loses control of the device. A pressure sensor may be disposed on the handle of the device such that when the user breaks contact with the handle, a signal from the pressure sensor is transmitted to the CPU indicating loss of contact with the handle. In response to the receipt of the signal from the pressure sensor, the control program may disengage the motor from the track, thereby allowing the track to free-wheel. The free-wheeling track will accelerate to match the precessional rotation rate, $\omega_{rp}$, such that $\omega_r$ quickly approaches zero. Alternatively, the motor may be engaged to counter-rotate the track such that the precession of the rotor assembly is offset by the counter-rotation of the track.

Figure 6A:
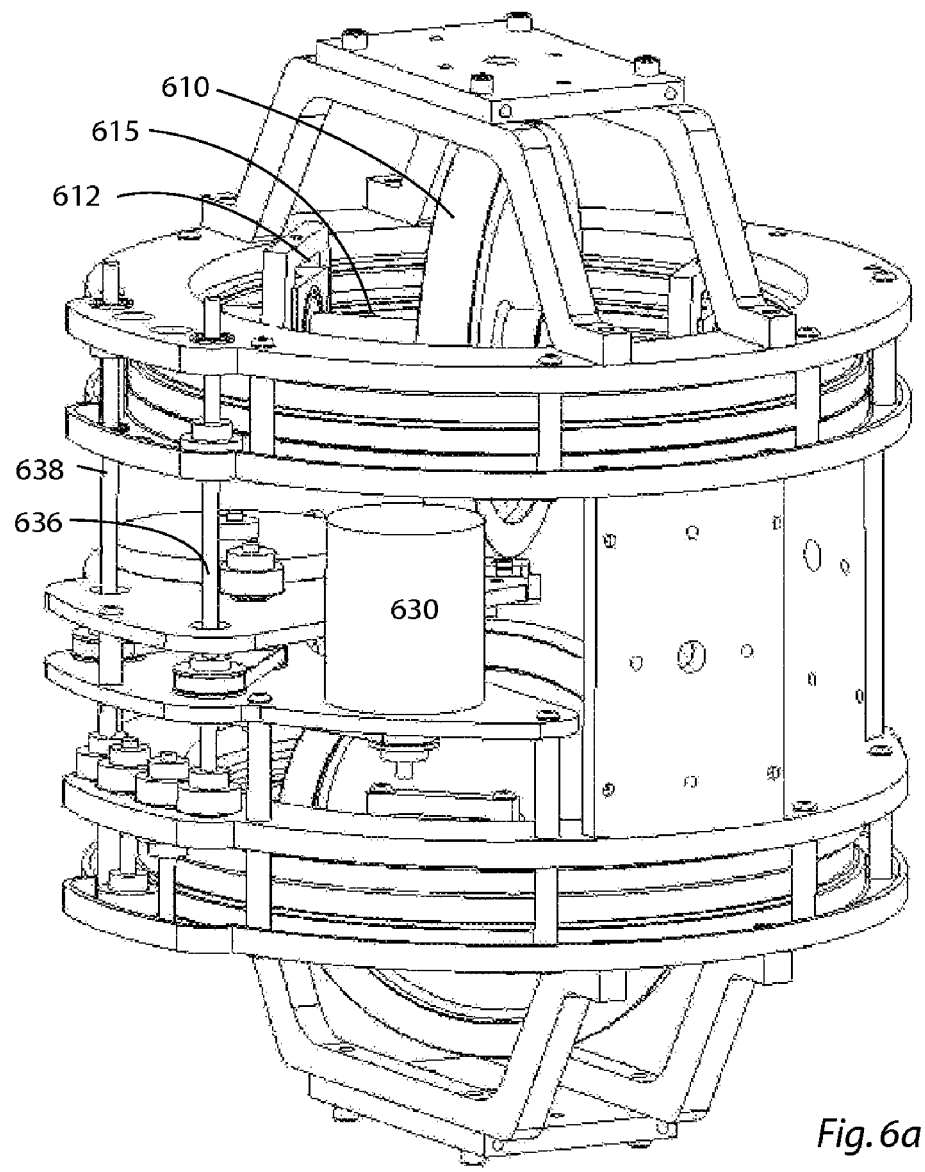
FIG. 6a is perspective rendering illustrating another embodiment of the present invention.

FIG. 6a is a rendering of another embodiment of the present invention. In the embodiment shown in FIG. 6a, the motor 630 drives the rotation of the track assembly 620 via track drive shaft 638 and the rotor assembly 625 via rotor drive shaft 636. Rotor 610 and axle 615 spins about an axis coincident with the axle's longitudinal axis. The spinning axle 615 is supported by rotor bearing 612, which is supported by the rotor assembly 625.

Figure 6B:
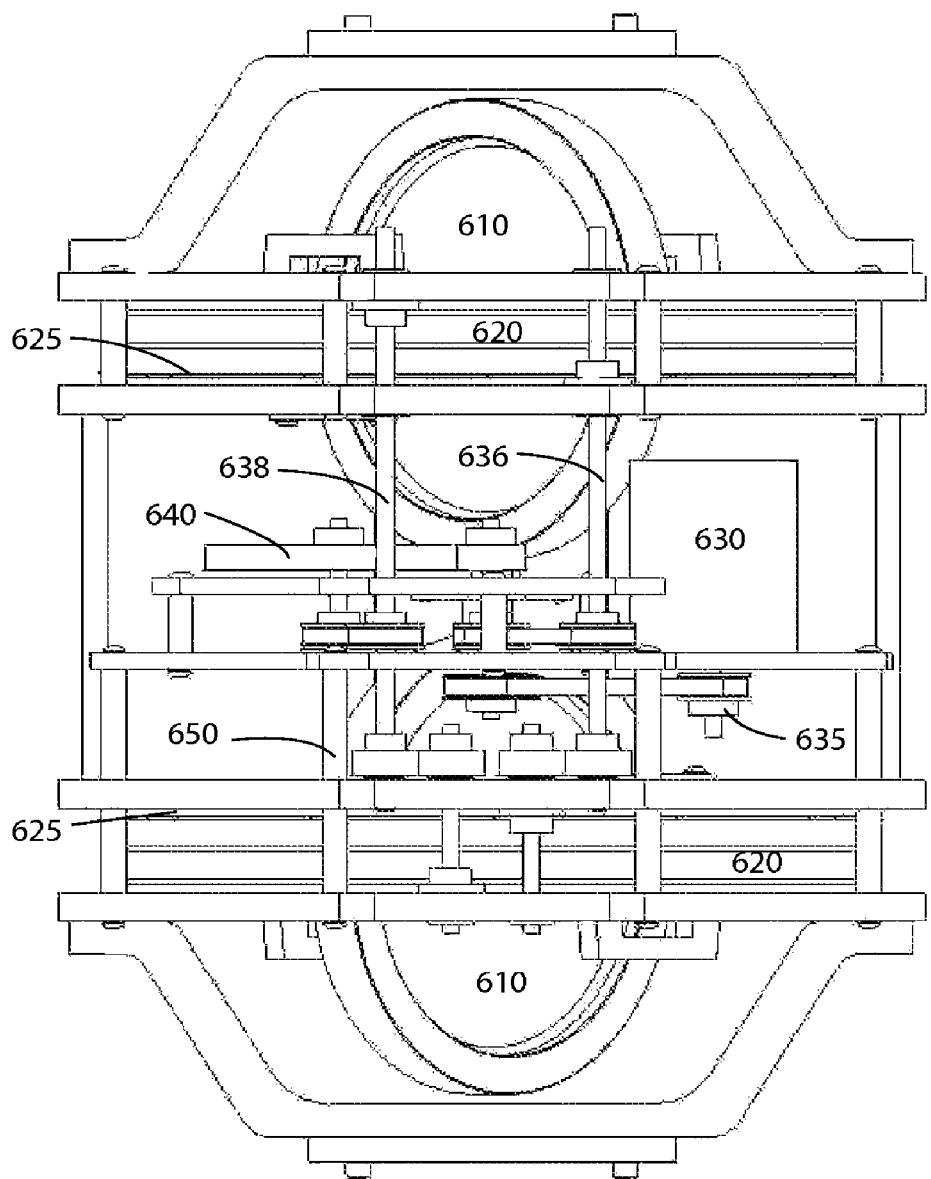

FIG. 6b is a side view of the embodiment shown in FIG. 6a. The motor drive shaft 635 is connected through a series of drive belts to the rotor drive shaft 636 and the track drive shaft 638. Transmission 640 couples the rotor drive shaft 636 to the track drive shaft 638 such that the track drive shaft 638 counter-rotates to the rotor drive shaft 636. In addition, transmission 640 fixes the ratio between the track rotation frequency and the rotor rotation frequency. The gear ratio of the transmission may be changed to better suit the intended use of the precessional engine.

Figure 6C:
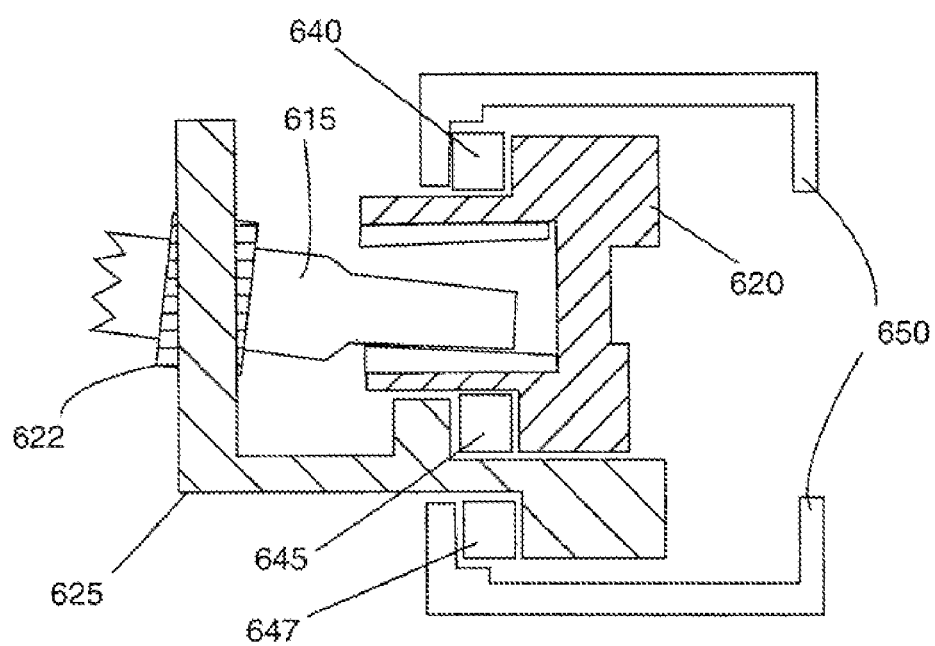
FIG. 6c is a section view of a detail of the embodiment shown in FIGS. 6a and 6b.

FIG. 6c is a section view of the axle and track assembly showing the axle tip configuration in the circular track. Referring to FIG. 6c, axle 615 is supported by rotor bearing 622, which is supported by the rotor bearing mount 625. In the compact design shown in FIG. 6c, the track 620 is supported by a housing—track bearing 640 that allows the track 620 to rotate relative to the housing chassis 650. The track 620 is also coupled to the rotor bearing mount 625 through a track—rotor assembly bearing 645 that allows rotational movement of the track 620 relative to the rotor bearing mount 625. The rotor bearing mount 625 is supported by a rotor assembly—housing bearing 647. In some embodiments, bearings 640, 645, and 647 are precision ring bearings that allow for a lightweight but very powerful precessional engine. The embodiment shown in FIG. 6c may be appropriate for specialized environments such as, for example, high-end rehabilitation market at a relatively high cost. For a broader market segment, designs incorporating inexpensive bearings or alternative methods may be incorporated using design methods readily available to one of skill in the art.

The configuration shown in FIGS. 6a, 6b and 6c show the track assemblies having a coincident rotation axis. It should be understood, however, that the present invention is not limited to such a configuration. The vertical alignment of the track assemblies enables a single motor to drive both track assemblies 620 and both rotor assemblies 625. Other embodiments within the scope of the present invention include, but are not limited to, multiple motors with each motor individually driving a single track or rotor assembly. When each track or rotor assembly is driven by its own motor, a transmission is not required and the rotation axes of the track assemblies may be parallel but not coincident.

The use of separate motors to drive the rotor and track assemblies allows independent control of $\omega_s$ and $\omega_r$ thereby allowing independent control of the output torque and torque oscillation frequency. The advantage of a single motor driving both the rotor and track assemblies through a transmission is reduced cost while still allowing high output torque at a suitable oscillation frequency. For a rotatable track, the relation between $\omega_s$ and $\omega_r$ is given by $\omega_s=\omega_r(1+G)(d_{track}/d_{axle})$ where G is the ratio, $G=\omega_t/\omega_r$. For prior art systems having a non-rotatable track, $\omega_t=0$ and $G=0$. Counter-rotating the track results in a positive G thereby generating a higher output torque at the same oscillation frequency. Rotating the track in the same direction as the rotation of the spinning rotor results in a negative G thereby reducing the output torque at the same oscillation frequency.

Figure 7:
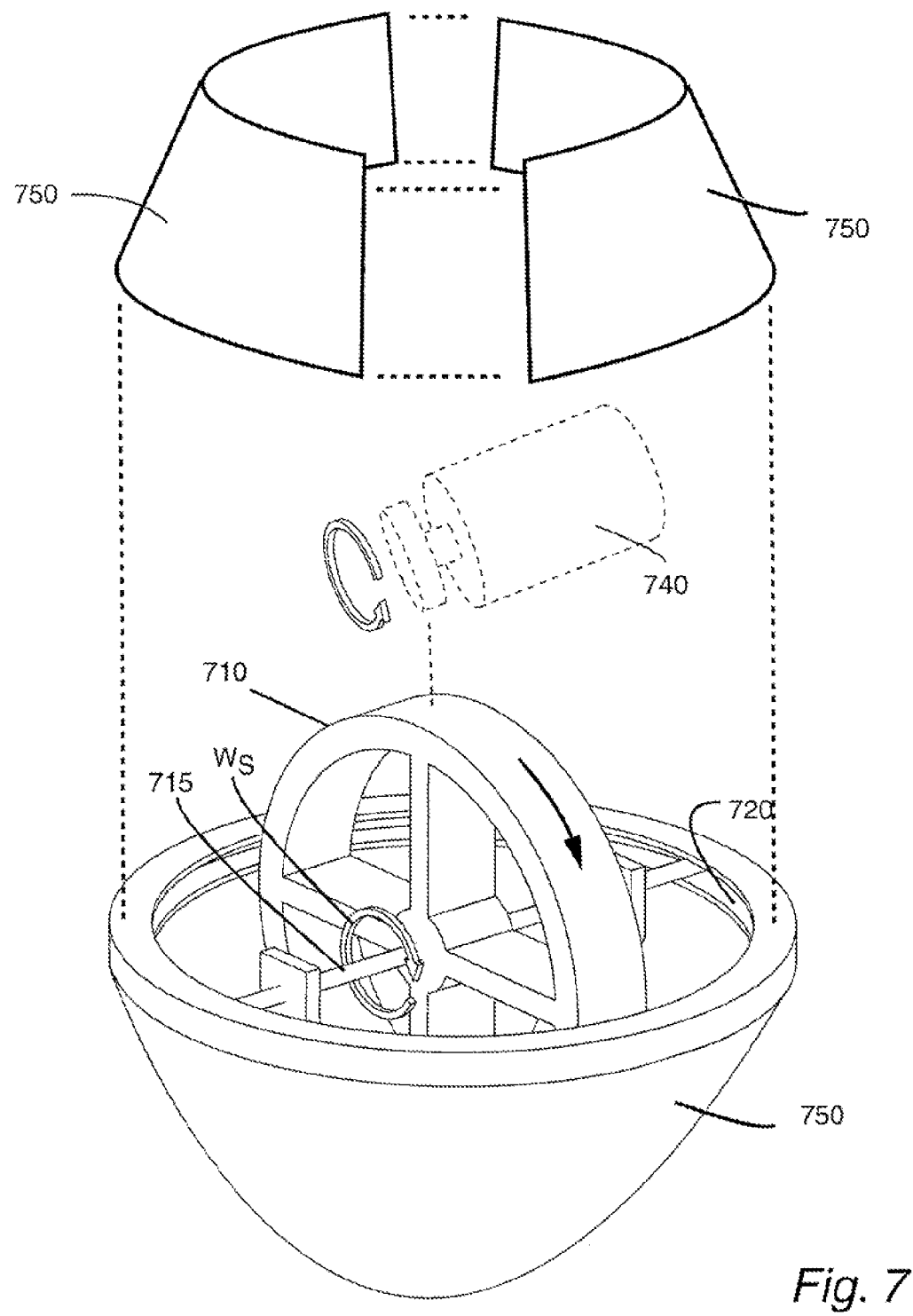
FIG. 7 is a perspective view of another embodiment of the present invention.

FIG. 7 is a perspective view illustrating another embodiment of the present invention. A rotor 710 and axle 715 spin about a spin axis that is coincident with the longitudinal axis of the axle 715. The tips of the axle 715 travel along the surface of a rotatable track assembly 720. The rotatable track assembly 720 is supported by a housing 750 that allows the track to rotate in the housing 750. An external driving force may be applied to the rotor such that the rotor 710 and axle 715 begin to spin about the spin axis. The external driving force may be a rotating motor shaft applied to the circumferential edge of the rotor or any mechanical or manual means for imparting a tangential force to the circumferential edge of the rotor. A portion of the rotational energy of the spinning rotor 710 may be transferred to the track via the frictional force of the spinning rotor tip against the track surface. The energy imparted by the spinning rotor may cause the track to counter-rotate to the rotation direction of the spinning rotor. A resistance force developed between the rotating track and housing reduces the rotation rate of the track thereby causing the rotor assembly to rotate in a direction opposite to the rotation of the track.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

The invention claimed is:

1. An apparatus comprising: a track that rotates; and a rotor having axle tips that frictionally contact the track as the rotor spins about a spin axis at a spin rate and rotates about a rotational axis at a rotation rate; wherein rotation of the track modifies a relative rotation rate of the rotor about the rotation axis independent of the spin rate of the rotor about the spin axis, and a clutch having a first configuration that maintains the relationship between the spin rate of the rotor and the rotation rate of the rotor and a second configuration that disrupts the relationship between the spin rate of the rotor and the rotation rate of the rotor.

2. The apparatus of claim 1, wherein the frictional contact between the axle tips and the track defines a relationship between the spin rate of the rotor about the spin axis and the rotation rate of the rotor about the rotational axis.

3. The apparatus of claim 1, wherein the track defines a continuous surface with a circular shape.

4. The apparatus of claim 1, wherein the track defines an upper continuous surface and a lower continuous surface, wherein one axle tip contacts the upper continuous surface while another axle tip contacts the lower continuous surface.

5. The apparatus of claim 1, wherein the axle tips are substantially aligned with the spin axis of the rotor.

6. The apparatus of claim 1, wherein the track rotates about the rotational axis of the rotor.

7. The apparatus of claim 1, wherein the rotation of the track with the clutch in the second configuration modifies the spin rate of the rotor about the spin axis.

8. An apparatus comprising: a track that rotates; a rotor having axle tips that frictionally contact the track as the rotor spins about a spin axis at a spin rate and rotates about a rotational axis at a rotation rate; wherein rotation of the track modifies a relative rotation rate of the rotor about the rotation axis independent of the spin rate of the rotor about the spin axis; and a transmission that couples the rotation of the rotor and the rotation of the track, wherein the transmission transforms a rotation of the rotor into a counter-rotation of the track.

9. The apparatus of claim 8, wherein the frictional contact between the axle tips and the track defines a relationship between the spin rate of the rotor about the spin axis and the rotation rate of the rotor about the rotational axis.

10. The apparatus of claim 8, wherein the track defines a continuous surface with a circular shape.

11. The apparatus of claim 8, wherein the track defines an upper continuous surface and a lower continuous surface, wherein one axle tip contacts the upper continuous surface while another axle tip contacts the lower continuous surface.

12. The apparatus of claim 8, wherein the axle tips are substantially aligned with the spin axis of the rotor.

13. The apparatus of claim 8, wherein the track rotates about the rotational axis of the rotor.

14. An apparatus comprising: a track that rotates; a rotor having axle tips that frictionally contact the track as the rotor spins about a spin axis at a spin rate and rotates about a rotational axis at a rotation rate; wherein rotation of the track modifies a relative rotation rate of the rotor about the rotation axis independent of the spin rate of the rotor about the spin axis; a motor that rotates the track; and a controller that is coupled to the motor and that controls the rotation rate of the track and thereby modify the relative rotation rate of the rotor about the rotation axis.

15. The apparatus of claim 14, wherein the controller controls the rotation rate of the track to maintain a relative rotational rate of the rotor in the range of 0.1 to 3.0 Hz.

16. The apparatus of claim 14, wherein the frictional contact between the axle tips and the track defines a relationship between the spin rate of the rotor about the spin axis and the rotation rate of the rotor about the rotational axis.

17. The apparatus of claim 14, wherein the track defines a continuous surface with a circular shape.

18. The apparatus of claim 14, wherein the track defines an upper continuous surface and a lower continuous surface, wherein one axle tip contacts the upper continuous surface while another axle tip contacts the lower continuous surface.

19. The apparatus of claim 14, wherein the axle tips are substantially aligned with the spin axis of the rotor.

20. The apparatus of claim 14, wherein the track rotates about the rotational axis of the rotor.

21. An apparatus comprising: a track that rotates; and a rotor having axle tips that frictionally contact the track as the rotor spins about a spin axis at a spin rate and rotates about a rotational axis at a rotation rate; wherein rotation of the track enables the following two modes:
    modifying the rotation rate of the rotor while maintaining a relatively constant spin rate of the rotor about the spin axis, and
    modifying the spin rate of the rotor while maintaining a relatively constant rotation rate of the rotor about the rotation axis.

\* \* \* \* \*